(12) United States Patent
Gaucher et al.

(10) Patent No.: US 11,124,157 B2
(45) Date of Patent: Sep. 21, 2021

(54) UNDETACHABLE END PIECE FOR A WIPER BLADE

(71) Applicant: Valeo Systèmes d'Essuyage, Le Mesnil Saint Denis (FR)

(72) Inventors: Vincent Gaucher, Le Mesnil Saint Denis (FR); Stéphane Houssat, Issoire (FR); Olivier Jomard, Issoire (FR); Eric Poton, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 267 days.

(21) Appl. No.: 16/328,994

(22) PCT Filed: Aug. 24, 2017

(86) PCT No.: PCT/EP2017/071295
§ 371 (c)(1),
(2) Date: Feb. 27, 2019

(87) PCT Pub. No.: WO2018/041703
PCT Pub. Date: Mar. 8, 2018

(65) Prior Publication Data
US 2019/0202409 A1  Jul. 4, 2019

(30) Foreign Application Priority Data

Aug. 31, 2016  (FR) ...................... 1658074

(51) Int. Cl.
*B60S 1/38*  (2006.01)
(52) U.S. Cl.
CPC .................. *B60S 1/3889* (2013.01)

(58) Field of Classification Search
CPC ..................................................... B60S 1/3889
See application file for complete search history.

(56) References Cited

U.S. PATENT DOCUMENTS

| 8,857,009 B2 | 10/2014 | Thielen et al. | |
| 2011/0113581 A1* | 5/2011 | Boland | B60S 1/3889 |
| | | | 15/250.31 |

FOREIGN PATENT DOCUMENTS

| DE | 20 2011 003000 U1 | 4/2011 |
| EP | 3034366 A2 | 6/2016 |
| ES | 1064326 U | 3/2007 |

OTHER PUBLICATIONS

International Search Report and Written Opinion issued in corresponding Internation Application No. PCT/EP2017/071295, dated Nov. 9, 2017 (9 pages).

* cited by examiner

*Primary Examiner* — Andrew A Horton
(74) *Attorney, Agent, or Firm* — Osha Bergman Watanabe & Burton LLP

(57) ABSTRACT

An end piece (1) for a vehicle windscreen wiper blade, the wiper blade comprising at least one flexible support (3) and a strip intended to be applied against the windscreen, the end piece (1) comprising: a housing (5) suitable for receiving an end portion of the flexible support (3), at least one locking means (7) for locking the end portion of the flexible support (3) in a position engaged in the housing (5), characterised in that the end piece (1) comprises at least one securing device (50) for securing the locking means (7), the securing device (50) being arranged to restrict the movement of the locking means (7). Said invention is applicable to motor vehicles.

Figure 1:
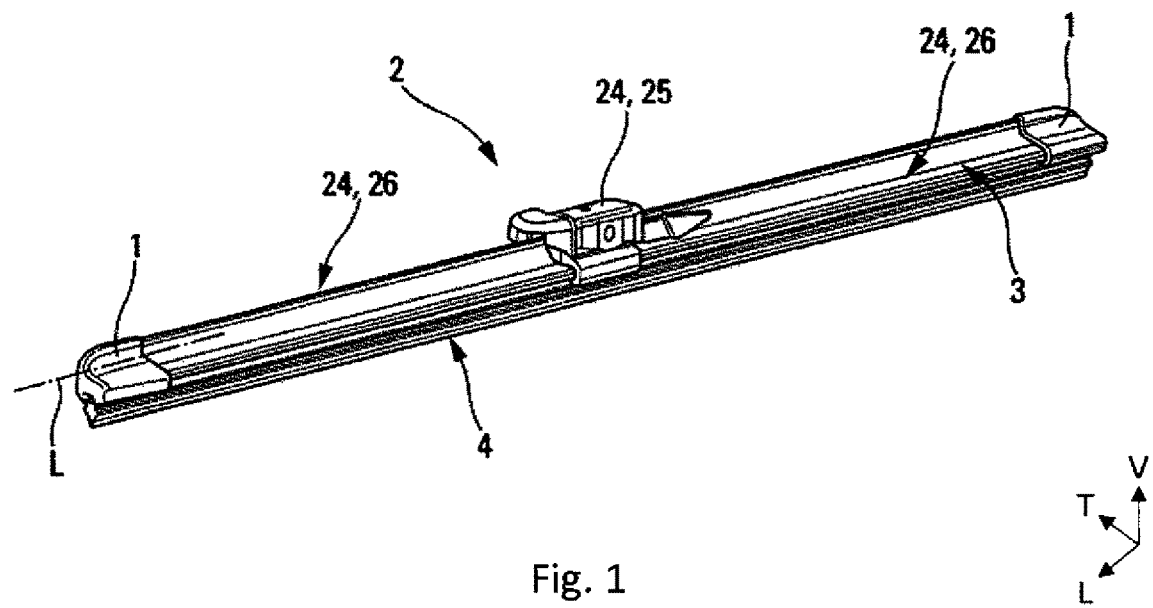

15 Claims, 2 Drawing Sheets

UNDETACHABLE END PIECE FOR A WIPER BLADE

The field of the present invention is that of the wiper blades used on motor vehicles. The invention particularly concerns an end piece mounted at the end of a wiper blade. The invention is also directed to a wiper blade and a wiper system incorporating a wiper blade of this kind.

Motor vehicles are routinely equipped with windshield wiper systems to wipe and wash the windshield and to prevent disturbance to the driver's view of their environment. These windshield wipers are classically driven by an arm effecting an angular to-and-fro movement and including elongate blades themselves carrying wiper rubbers made from an elastic material. These wiper rubbers rub against the windshield and evacuate water, removing it from the field of view of the driver. The blades are made either in the form, in a classic version, of articulated crossbars that hold the wiper rubber at a number of discrete locations or in the form, in a more recent so-called "flat blade" version, of a semi-rigid assembly that holds the wiper rubber over all its length. In this second solution, the blade is attached to the rotating windshield wiper arm by an assembly consisting of a mechanical connector and an adapter. The mechanical connector is a part that is crimped directly to the flat blade, whereas the adapter is an intermediate part that enables fixing of the connector to the windshield wiper arm.

The document U.S. Pat. No. 8,857,009B2 shows a wiper blade equipped with an end piece comprising at least one flexible support and a wiper rubber intended to be pressed against the windshield, the end piece comprising a housing adapted to receive an end part of the flexible support and at least one means for locking the end part of the flexible support in position when engaged in the housing. The end piece disclosed in the above document suffers from a number of disadvantages.

Firstly, it is found that the locking means may be actuated unintentionally, which in some situations leads to uncoupling of the end piece from the wiper blade. Although access to the locking means is made more complex, movement of the locking means is not really impeded.

Secondly, the mechanical connection between the securing means and the support of the blade is not adequate. It is necessary to improve the safety level of this mechanical connection.

The aim of the present invention is therefore to remedy the disadvantages described above through designing an end piece or a wiper blade that includes a device that makes secure the fixing of the locking means relative to the flexible support of the wiper blade.

The object of the invention is therefore an end piece for a vehicle window wiper blade comprising at least one flexible support and a wiper rubber intended to be pressed against the window, the end piece comprising a housing adapted to receive an end part of the support, the end piece comprising at least one locking means for locking the end portion of the support in position when engaged in the housing, the end piece comprising at least one securing device for securing the locking means, the securing device being adapted to restrict movement of the locking means.

A first advantage of the invention lies in the impossibility of unintentional unlocking of the locking means. This very clearly increases the level of security of the assembly of the end piece onto the end of the wiper blade. The various components of the wiper blade such as for example the air deflector or deflectors therefore cannot be demounted and cannot be removed from the wiper arm without damaging the latter.

Moreover, the invention offers increased security of mounting compared to the prior art device. It also makes it possible to circumvent problems of manufacturing tolerances and assembly tolerances in respect of the locking means. Finally, the invention makes it possible to carry out generally improved quality control on the wiper blade assembly line.

The securing device is arranged on the end piece so as to restrict movement of the locking means in only one movement direction, the locking means moving in two opposite directions.

The single direction in which the securing device secures the locking means is advantageously a direction in which the locking means tends to become housed in the notch of the flexible support.

The locking means is adapted to cooperate with a notch formed in the end part of the flexible support in the position engaged in the housing. The locking means and the notch formed in the end part of the flexible support have a complementary shape.

The locking means is adapted to be deformed elastically during insertion of the end part of the flexible support into the housing of the end piece. The end part of the flexible support is inserted into the housing of the end piece between the locking means and the securing device. The locking means is adapted to resume its initial shape when it faces the notch in the end part of the flexible support. The locking means is adapted to immobilize the flexible support against movement in translation out of the housing of the end piece.

In one embodiment, the securing device restricts the movement of the locking means to prevent it leaving the notch once the locking means is housed in the notch. The securing device may be adapted to prevent all movement of the locking means or to restrict the movement of the locking means in order to prevent unintentional uncoupling of the end piece and the flexible support. In another alternate or complementary embodiment, the securing device blocks access to the locking means so that it becomes impossible to separate the end piece from the flexible support without leading to its destruction.

During use of a wiper system comprising a drive arm connected to a wiper blade comprising at least one end piece according to the invention the drive arm will transmit a swivel movement to the wiper blade. Consequently, the wiper blade, and more particularly the flexible support, will exert stress on the locking means of the end piece, via its notch. Because of this force, the locking means will be affected by an angular displacement movement and/or a movement of elastic deformation, in a direction or in a plane as a function of the shape of the locking means and/or of the movement undergone.

Thus the angular displacement movement may occur in a movement plane perpendicular to the general plane in which the housing extends and in particular movement toward each other in that movement plane of a free end of the locking means and a face of an internal envelope of the end piece. The angular displacement movement may equally occur along a circular arc contained in the movement plane.

Alternatively or cumulatively, the angular displacement movement may occur through a rotation about an axis, that axis being situated at the edge forming the junction between the locking means and a body of the end piece supporting the locking means.

The securing device is formed at least by a rib that extends in a plane parallel to the plane of movement of the locking means.

Depending on the arrangement of the locking means, the securing device may be formed facing the locking means or on at least one of the lateral edges of the locking means. The rib may be aligned with the locking means or off-axis relative to the latter.

To be more precise, the plane of the rib and the plane of movement of the locking means are parallel. To be even more precise, the plane of the rib intersects an upper face of the locking means. The rib is thus contained within the thickness of the locking means. Depending on the conformation of the locking means, the rib may therefore be disposed between the locking means and the envelope of the end piece or between the locking means and the body of the end piece.

In one embodiment of the invention, the locking means interferes with the rib. The locking means may interfere with the rib by way of a point or plane bearing engagement between the two elements. The interference between the rib and the locking means reduces the deformations of the locking means and prevents it from leaving the notch of the flexible support. The interference may equally be such as to avoid plastic deformations or rupture of the locking means. This interference occurs in particular upon movement of the flexible support during its normal use or in the event of attempted demounting.

The end piece is delimited by an envelope. Said envelope forms an external wall of the end piece. The securing device, in particular the rib, arises from an internal face of the envelope. The securing device, in particular the rib, extends toward the interior of the end piece. The securing device, in particular the rib, may be integral with or attached to the envelope. If it is attached, forming it by molding during or not during the same operation as that leading to the formation of the end piece may be envisaged.

The securing device restricts movement of the locking means in a direction substantially perpendicular to a general plane in which the housing extends. The securing device has the function of immobilizing the locking means in one of the directions corresponding to the direction of movement of the locking means. The movement of the locking means may be restricted in part or totally.

The securing device restricts movement in rotation of the locking means. During use of the wiper blade, the flexible support carrying the wiper rubber moves. This being so, the end part of the flexible support acts on the locking means. Consequently, one possible movement of the locking means is a rotation, which may, depending on its magnitude, drive uncoupling, otherwise termed separation, of the end piece and the flexible support. The presence of the securing device therefore makes it possible to retain the locking means in position, which consequently prevents uncoupling of the end piece and the flexible support. The movement in rotation of the locking means may be restricted in part or totally.

The securing device may equally be adapted to restrict the movement of the locking means when the latter follows a movement in rotation. The movement of the locking means may be restricted in part or totally in one or more of the directions referred to.

In another alternative or complementary embodiment, the securing device restricts or blocks access to the locking means once the end part of the flexible support is in place.

In one embodiment of the invention, the securing device extends substantially perpendicularly to a plane in which the housing mostly extends and parallel to a longitudinal direction of the end piece.

A clearance is notably provided between the locking means and the securing device. This clearance may be between 0.1 and 1 mm inclusive. The clearance is provided to effect a compromise between ease of insertion of the end part of the flexible support into the end piece and securing of the assembly. A small clearance increases security whereas a larger clearance facilitates insertion.

Alternatively, the securing device and the locking means are in contact. The securing device and the locking means may be in contact before insertion of the end part of the flexible support or after insertion of the end part of the flexible support. The contact between the two elements may be a point bearing engagement between an edge of one element and a face of the other or again a plane bearing engagement. The locking means is therefore restricted in its movement by the immediate contact with the securing device. The contact between the securing device and the locking means makes it possible to strengthen the impossibility of demounting the end part of the flexible support from the end piece.

The locking means comprises a locking device having an "L" shape profile as seen in a plane substantially perpendicular to a plane in which the housing mostly extends. The locking device participates in retaining the locking means in the notch of the end part of the flexible support. One branch of the "L" extends parallel to the longitudinal direction of the end piece whereas a second branch of the "L" extends perpendicularly to the longitudinal direction of the end piece. The first branch of the "L" is adapted to cover, at least in part, a section of the end part of the flexible support.

The locking means or one of its components is manufactured from a material having elastic properties. The securing device is manufactured from a material or a mixture of materials conferring upon it great stiffness. The securing device is therefore not greatly subject to deformations and thus enables optimum immobilization of the locking means.

Another object of the invention is a wiper blade comprising at least one flexible support and a wiper rubber intended to be pressed against the windscreen and at least one end piece as described above, where the end part of the flexible support extends in the housing of the end piece.

The locking means more particularly extends in the notch of the flexible support. The notch of the flexible support has a shape complementary to the locking means.

The invention finally concerns a vehicle window wiper system comprising an arm and a wiper blade conforming to its preceding aspect.

Figure 2:
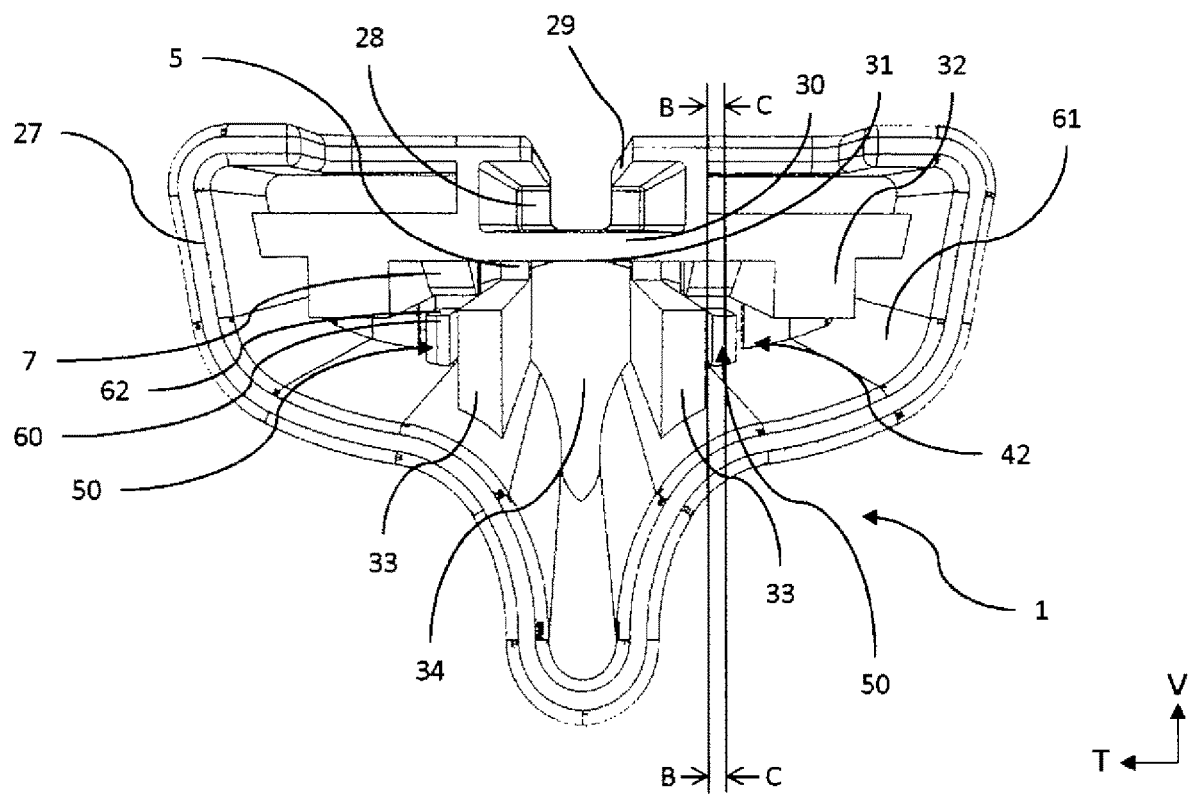
Figure 3:
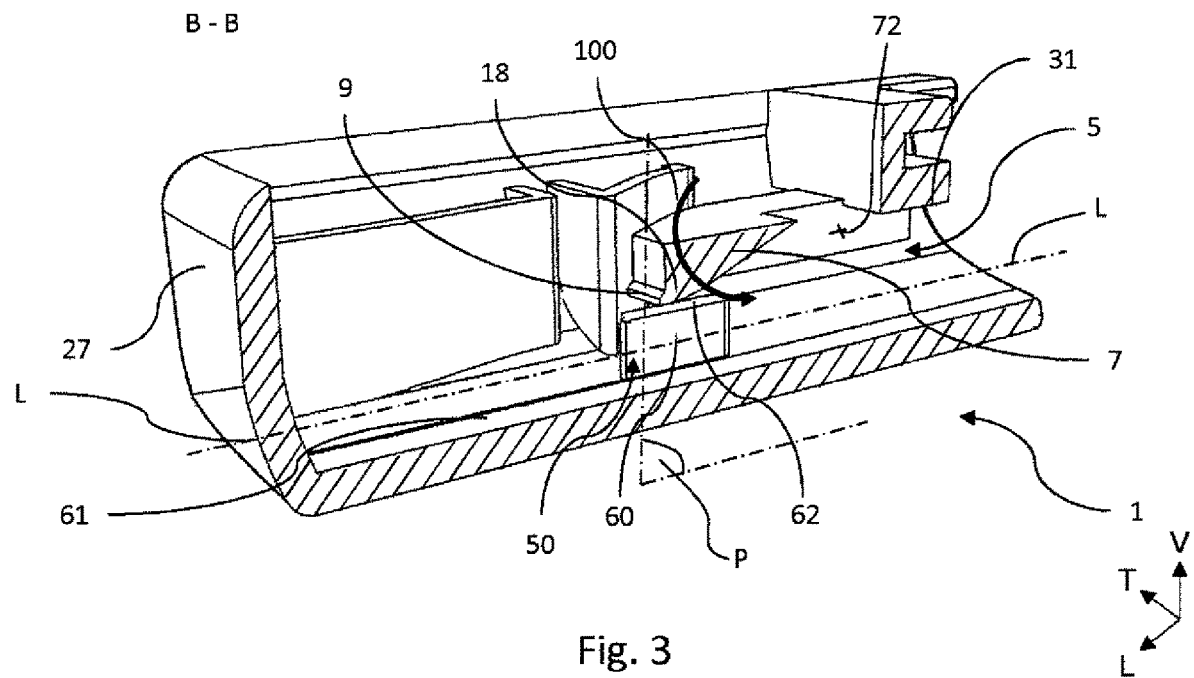
Figure 4:
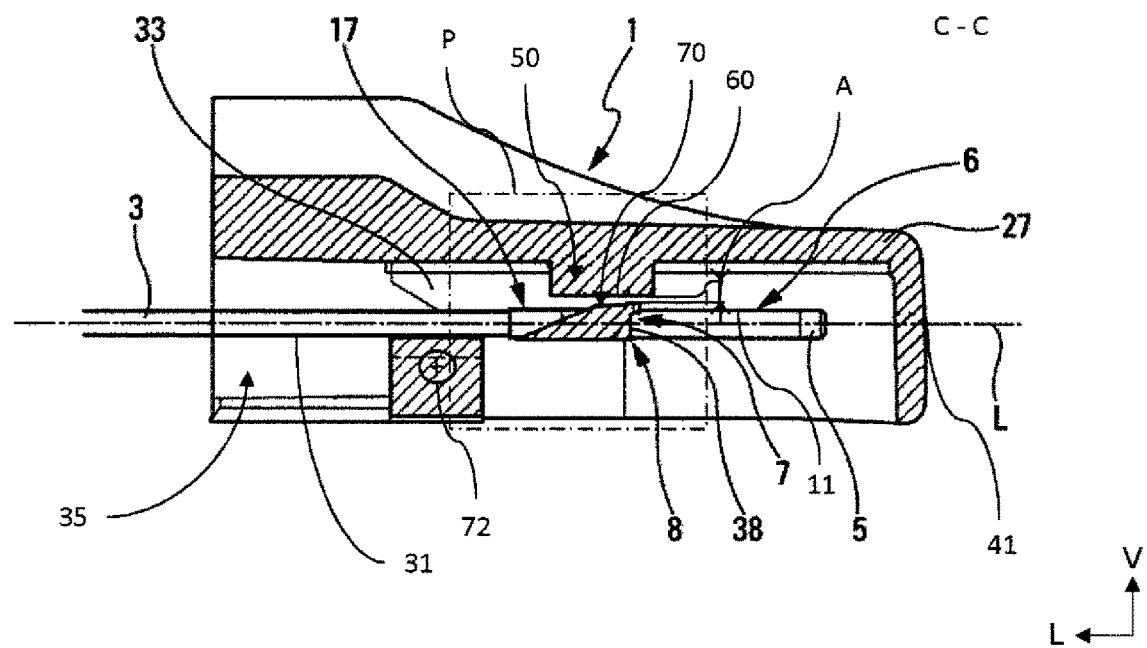

Other features, details and advantages of the invention will emerge more clearly on reading the description given hereinafter by way of illustration and with reference to the drawings, in which:

FIG. 1 is a general perspective view of a wiper blade according to the invention, FIG. 2 is a perspective view from the front of an end piece according to the invention, FIG. 3 is a view in section of the end piece taken along the line B-B, FIG. 4 is a view of the end piece from FIG. 2 in section taken along the line C-C when mounted on a flexible support constituting a wiper arm.

It should first be noted that the figures disclose the invention in detail for the purpose of execution of the invention, said figures being of course able to serve to define the invention better if necessary.

In the remainder of the description, the terms longitudinal or lateral, above, below, front, rear refer to the orientation of the wiper blade or of the end piece according to the invention. The longitudinal direction corresponds to the principal axis of the wiper blade along which it extends, whereas the lateral orientations correspond to straight lines that are concurrent, that is to say that cross the longitudinal direction, notably perpendicularly to the longitudinal axis of the wiper blade in its rotation plane. For the longitudinal directions, the terms exterior and interior are to be understood relative to the point at which the wiper blade is fixed to a rotating drive arm of that blade, the term interior corresponding to the part in which the arm and one half-blade extend. Finally, the directions referred to as upper or lower correspond to orientations perpendicular to the rotation plane of the wiper blade, the term lower containing the plane of the windshield.

Referring first of all to FIG. 1, there is seen a wiper blade 2 according to the invention. A wiper blade 2 of this kind is used to rub ob a window of a vehicle to move water deposited on that window out of the field of view of a driver. The wiper blade 2 consists at least of a flexible support 3, a component 24, a wiper rubber 4 and at least one, or even two, end pieces 1 installed on each end part 6 of the flexible support 3. The flexible support 3 is a longitudinal support.

The flexible support 3 may take the form of a single flat elastic metal strip. Alternatively, the flexible support 3 may be formed by two elastic and metal strips each housed in a groove formed on either side of the wiper rubber 4. In both the above cases, in the rest state, a metal strip of this kind is curved in a plane perpendicular to a longitudinal direction of the strip. The function of a metal strip of this kind, whether single or double, is to distribute the bearing forces along the wiper rubber 4 generated by a connection means 25 attached to the flexible support at the longitudinal center of the wiper arm 2.

The component 24 is one of a number of types of component of the wiper blade 2. It may be the connection means 25 intended to connect the wiper blade 2 to a rotation drive arm of this blade. It may equally be one or more air deflectors 26 attached to the flexible support 3 and the function of which is to transform the stream of air passing over the wiper blade 2 into a bearing force that presses the wiper rubber 4 against the window.

The wiper blade 2 further comprises two identical end pieces 1, as described below with reference to FIGS. 2 to 4.

FIGS. 2 and 3 are perspective views of the end piece 1. An end piece 1 of this kind has a function of mechanical retention of the components constituting the wiper blade 2. This end piece 1 also has an aesthetic function since it makes it possible to cover neatly and thus to conceal the end of the wiper rubber 4, the end of the flexible support 3 and the end of the component 24, notably the air deflector 26.

The end piece 1 includes an envelope formed of an exterior wall 27 globally complementary to the exterior profile of the air deflector 26. Inside an internal volume 42 delimited by the exterior wall 27 the end piece 1 comprises a housing 5 to receive the end part 6 of the flexible support, not shown in this figure. The end piece 1 further comprises a groove 28 the function of which is mechanical retention of a heel of the wiper rubber 4. A groove 28 of this kind is formed in a body 30 of the end piece 1, in particular in a lower part of that body. This groove 28 is open toward the exterior, this opening being delimited by two hooks 29 that extend longitudinally along the end piece 1.

The housing 5 is formed in the body 30 of the end piece 1, between the groove 28 and the exterior wall 27, when seen in a direction perpendicular to the plane in which the groove 28 extends. It extends in a general extension plane parallel to the plane in which the groove 28 extends. The housing 5 is delimited by a bottom wall 31 and at least two lateral edges 32, as well as by at least one flank 33, and in particular two flanks 33. Each of the flanks 33 is formed by an edge integral with the exterior wall 27. The flanks 33 extend in planes perpendicular to a plane in which the bottom wall 31 extends and thus parallel to planes in which the lateral edges 32 extend.

The end piece 1 further comprises a locking means 7 visible in FIG. 2. This is a means the function of which is to retain the end piece 1 on the wiper blade 2 in the longitudinal direction, to prevent it from moving toward the exterior of the wiper blade, in the longitudinal direction of the latter. This locking means 7 takes for example the form of a tooth or of a tongue at the end of which a tooth is formed, intended to be housed in a notch formed on or in the flexible support 3. The locking means 7 is formed from a material having elastic properties. Said notch will be further described in the part of the description devoted to FIG. 4. The locking means 7 is therefore designed to flex to allow the insertion of the longitudinal end of the flexible support 3 in the end piece 1.

The securing device 50 according to the invention takes for example the form of a rib 60. In particular, the securing device 50, notably the rib 60, is integral with the envelope 27 of the end piece 1. In the FIG. 2 example, the securing device 50 and the locking means 7 are disposed in the same plane, that is to say that the securing device 50 is disposed facing the locking means 7. In the example shown the securing device 50 is situated between the lateral edges 32 and the flanks 33 of the housing 5.

Alternatively, the rib 60 may be formed laterally of the locking means 7, that is to say on the side of the latter.

The rib 60 of the securing device 50 takes the form of a thin plate. The rib 60 has a first face facing a longitudinal median plane of the end piece 1, that plane passing through a summit of the end piece 1, and a second face opposite the first, the thickness of the plate being the dimension between these two faces. The ratio between the thickness of the rib 60 of the securing device 50 and that of the locking means 7 is between ¼ and 1 inclusive.

The rib 60 has a face 62 opposite the part adjacent to the interior face 61 of the envelope 27. The face 62 faces the locking means 7. The face 62 is parallel to the bottom wall 31 of the end piece 1. When the locking means 7 performs an angular displacement movement, it comes into contact with the face 62.

In the FIG. 2 example, the end piece 1 according to the invention includes two securing devices 50 each including a rib 60. The ribs 60 are parallel to one another. Moreover, the ribs 60 are formed symmetrically with respect to the aforementioned median longitudinal plane.

Each rib 60 extends longitudinally over a portion of the envelope 27, that portion being the same length as or longer than the locking means 7.

Referring now to FIG. 3, there can be seen an example of movement of the locking means 7. FIG. 3 is a section taken along a line B-B parallel to the longitudinal median plane of the end piece and passing through a summit of the end piece.

A movement 100 may be effected in a direction perpendicular to the longitudinal direction L of the end piece 1 and along a circular arc contained in a plane (P) of movement of the locking means 7. The locking means 7 therefore turn about an axis referenced 72 in FIGS. 3 and 4, in the plane P of movement. A clearance A is in particular provided between the locking means 7 and the securing device 50, as shown in FIG. 4.

The end piece 1 comprises a rear part 41 that closes the interior volume 42 of the end piece by means of the exterior wall 27. At the opposite end relative to the housing 5 in the longitudinal direction L visible in FIGS. 1 and 4, the end piece 1 is open and the exterior wall 27 delimits a receiving zone 35. The latter notably receives at least one of the components of the wiper blade, for example one end of the air deflector that comes to be housed in the reception zone 35.

A method of assembling a wiper blade 2 equipped with an end piece 1 will now be described.

In one nonlimiting example of the method, the wiper blade 2 comprises at least one flexible support 3 and at least one component 24 mounted on the flexible support 3. In one embodiment the component 24 may be one or more air deflectors 26 or a connecting means 25 intended to connect the wiper arm 2 mechanically to a rotation drive arm. The wiper blade 2 employed in this method further comprises an end piece 1 with a housing 5 that receives an end part 6 of the flexible support 3. The end piece 1 also comprises at least one locking means 7 for locking the end part 6 of the flexible support 3 in position when engaged in the housing 5 after the latter has been engaged in the housing 5. This locking occurs through cooperation between the locking means 7 and a notch 17 formed in or on the flexible support 3.

The end piece 1 further comprises a securing device 50 for securing the locking means 7, the function of which is to restrict or to prevent movement of the locking means 7 and consequently outward movement in translation of the flexible support 3 out of the housing 5 of the end piece 1.

The end piece 1 comprises an immobilizing device 18 for immobilizing the locking means 7, the function of which is to restrict the possibility of unintentional maneuvering of the locking means 7.

In one step of the method, the end piece 1 is threaded onto the end part 6 of the flexible support 3. In an innovative manner, the component 24 is stressed longitudinally so that the immobilizing device 18, notably the element 9, enters the notch 7. The stressing step is made possible for example by exploiting the operating clearances and the manufacturing tolerances of the component or components 24, or by deforming the latter, in particular in the longitudinal direction of the wiper blade 2. This therefore enables the element 9 to go beyond the notch 17 so as to come to be positioned on a face 11 of the flexible support 3. The elasticity of the component, notably the air deflector or deflectors 26, guarantees a force that presses a portion 8 of the locking means 7 against an edge 38 of the notch 17 and thus correct positioning of the immobilizing device 18 on the flexible support 3. During movements of the wiper blade, and notably of the flexible support 3 and of its end part 6, the locking means 7 moves in a direction essentially perpendicular to the longitudinal direction L of the housing 5. The securing device 50 interferes with the movement of the locking means 7, preventing or restricting it, and prevents extraction of the locking means 7 from the notch 17.

The wiper blade 2 equipped in this way with an end piece 1 may now be mounted on an arm, thus enabling effective wiping of the window of a vehicle equipped with a system of this kind.

The invention claimed is:

1. An end piece for a vehicle window wiper blade, the wiper blade comprising at least one flexible support and a wiper rubber applied against the window, the end piece comprising:
   a housing for receiving an end portion of the flexible support;
   at least one locking means for locking the end portion of the flexible support in position when engaged in the housing; and
   at least one securing device for securing the locking means, the securing device being adapted to restrict the movement of the locking means caused by a swivel movement of the wiper blade.

2. The end piece as claimed in claim 1, wherein the locking means cooperates with a notch formed in the end portion of the flexible support in position when engaged in the housing.

3. The end piece as claimed in claim 1, wherein the securing device is formed by at least one rib that extends in a plane parallel to a plane of movement of the locking means, wherein the plane of movement of the locking means is parallel to the swivel movement of the wiper blade.

4. The end piece as claimed in claim 3, wherein the plane of the rib intersects an upper face of the locking means.

5. The end piece as claimed in claim 1, wherein the securing device restricts movement of the locking means in a direction substantially perpendicular to a general plane in which the housing extends.

6. The end piece as claimed in claim 1, wherein the end piece is delimited at least by an envelope and wherein the rib arises from an internal face of the envelope.

7. The end piece as claimed in claim 3, wherein the locking means move in the plane of movement with a movement in rotation about an axis.

8. The end piece as claimed in claim 1, wherein the securing device extends substantially perpendicularly to a general plane in which the housing extends and parallel to a longitudinal direction of the end piece.

9. The end piece as claimed in claim 1, wherein there is a clearance between the locking means and the securing device.

10. The end piece as claimed in claim 1,
    wherein the at least one rib comprises a face separate from the at least one locking means, and
    wherein the at least one locking means comes into contact with the face in response to an angular displacement movement of the at least one locking means caused by the swivel movement of the wiper blade.

11. The end piece as claimed in claim 1, wherein the locking means comprises an immobilizing device having an "L" shape profile as seen in a plane substantially perpendicular to a plane in which the housing substantially extends.

12. The end piece as claimed in claim 1, further comprising two securing devices each including a rib.

13. A wiper blade comprising:
    at least one flexible support;
    one wiper rubber that is pressed against a window; and
    at least one end piece as claimed in claim 1, where the end portion of the flexible support extends in the housing of the end piece.

14. The wiper blade as claimed in claim 13, wherein the locking means extends in a notch of the flexible support.

15. A vehicle window wiper system comprising:
an arm; and
a wiper blade comprising:
- at least one flexible support,
- one wiper rubber that is pressed against a window, and
- at least one end piece comprising:
    - a housing for receiving an end portion of the flexible support,
    - at least one locking means for locking the end portion of the flexible support in position when engaged in the housing,
    - at least one securing device for securing the locking means, the securing device being adapted to restrict the movement of the locking means caused by a swivel movement of the wiper blade,
    - wherein the end portion of the flexible support extends in the housing of the end piece.

* * * * *